United States Patent
Ban (10) Patent No.: US 7,733,863 B2
(45) Date of Patent: Jun. 8, 2010

(54) OUT OF BAND MESSAGES

(75) Inventor: Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 358 days.

(21) Appl. No.: 11/809,076

(22) Filed: May 30, 2007

(65) Prior Publication Data

US 2008/0298355 A1 Dec. 4, 2008

(51) Int. Cl.
*H04L 12/28* (2006.01)
*H04L 12/56* (2006.01)

(52) U.S. Cl. .............. 370/392; 370/389; 370/395.3; 370/395.31; 370/395.52

(58) Field of Classification Search ............... 709/219, 709/224, 217, 203; 370/400, 401, 463, 230, 370/389, 390, 392, 395.3, 395.31, 395.52, 370/432; 718/104, 106, 103; 719/315
See application file for complete search history.

(56) References Cited

U.S. PATENT DOCUMENTS

| | | | |
|---|---|---|---|
| 5,627,892 A | 5/1997 | Kauffman | |
| 5,754,771 A | 5/1998 | Epperson et al. | |
| 5,774,668 A | 6/1998 | Choquier et al. | |
| 5,793,975 A * | 8/1998 | Zeldin | 709/224 |
| 6,104,716 A | 8/2000 | Crichton et al. | |
| 6,212,573 B1 * | 4/2001 | Lim et al. | 719/315 |
| 6,885,638 B2 * | 4/2005 | Xu et al. | 370/230 |
| 6,886,041 B2 | 4/2005 | Messinger et al. | |
| 7,051,330 B1 * | 5/2006 | Kaler et al. | 718/106 |
| 7,085,814 B1 * | 8/2006 | Gandhi et al. | 709/208 |
| 7,139,811 B2 * | 11/2006 | Lev Ran et al. | 709/217 |
| 7,197,751 B2 * | 3/2007 | Fedotov et al. | 719/323 |
| 7,207,043 B2 * | 4/2007 | Blythe et al. | 718/104 |
| 7,260,623 B2 | 8/2007 | Wookey et al. | |
| 7,330,891 B2 * | 2/2008 | Yodaiken | 709/224 |
| 7,400,581 B2 * | 7/2008 | Masputra et al. | 370/230 |
| 7,418,506 B1 * | 8/2008 | Achtermann et al. | 709/227 |
| 2002/0120697 A1 * | 8/2002 | Generous et al. | 709/206 |
| 2002/0152299 A1 | 10/2002 | Traversat et al. | |
| 2003/0084097 A1 * | 5/2003 | Messinger et al. | 709/203 |
| 2003/0093499 A1 * | 5/2003 | Messinger et al. | 709/219 |

(Continued)

OTHER PUBLICATIONS

Ban (JavaGroups User's Guide—Nov. 2002).*

(Continued)

*Primary Examiner*—Jayanti K Patel
*Assistant Examiner*—Christopher T Wyllie
(74) *Attorney, Agent, or Firm*—Blakely, Sokoloff, Taylor & Zafman LLP (57) ABSTRACT

A method and apparatus for processing message is described. In one embodiment, an application programming interface is configured for receiving and sending messages. A building block layer is coupled to the application programming interface. A channel layer is coupled to the building block layer. A transport protocol stack is coupled to the channel layer for implementing properties specified by the channel layer. The transport protocol stack has a concurrent stack consisting of an out of band thread pool and a regular thread pool. The regular thread pool forms one thread for every messages from a sender. The out of band thread pool to form one thread for messages marked as out of band from the sender. Messages processed with the thread from the out of band thread pool are processed before messages processed with the regular thread pool.

12 Claims, 6 Drawing Sheets

U.S. PATENT DOCUMENTS

| | | | |
|---|---|---|---|
| 2004/0057434 A1* | 3/2004 | Poon et al. | 370/392 |
| 2004/0076155 A1 | 4/2004 | Yajnik et al. | |
| 2004/0174877 A1* | 9/2004 | Masputra et al. | 370/392 |
| 2004/0177165 A1* | 9/2004 | Masputra et al. | 709/250 |
| 2004/0260798 A1* | 12/2004 | Addington et al. | 709/223 |
| 2005/0108331 A1* | 5/2005 | Osterman | 709/205 |
| 2006/0259585 A1* | 11/2006 | Keohane et al. | 709/219 |
| 2007/0174474 A1* | 7/2007 | Zhong et al. | 709/230 |
| 2008/0098321 A1* | 4/2008 | Krithivas | 715/771 |
| 2008/0108437 A1* | 5/2008 | Kaarela et al. | 463/42 |
| 2008/0298363 A1* | 12/2008 | Ban et al. | 370/390 |
| 2008/0301706 A1* | 12/2008 | Ban | 719/313 |
| 2008/0301709 A1* | 12/2008 | Ban | 719/314 |

OTHER PUBLICATIONS

Bela Ban, JavaGroups—Group Communication Patterns in Java, Department of Computer Science Cornell University, Jul. 31, 1998, pp. 1-18.

Bela Ban, JavaGroups User's Guide, Nov. 16, 2002, pp. 1-39.

Red Hat Office Action for U.S. Appl. No. 11/807,624 mailed Jul. 9, 2009.

Red Hat Office Action for U.S. Appl. No. 11/809,225 mailed Jul. 9, 2009.

* cited by examiner

OUT OF BAND MESSAGES

TECHNICAL FIELD

Embodiments of the present invention relate to group communication, and more specifically to processing messages.

BACKGROUND

Group communication protocol designed for multicast communication may be used to communicate messages between endpoints forming a group. Communication endpoints can be processes or objects, or any entity that can send and receive messages to/from a group.

However, messages from different senders are conventionally processed in a First In First Out (FIFO) order in a single queue for incoming messages by one thread. The messages are processed sequentially in the order they are received. A bottleneck may thus be formed since every message has to wait for its turn to be processed accordingly.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for processing messages marked as out of band using a concurrent stack of a transport protocol. Out of band messages are processed before other types of messages.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices.

Group Communication Architecture

Figure 1:
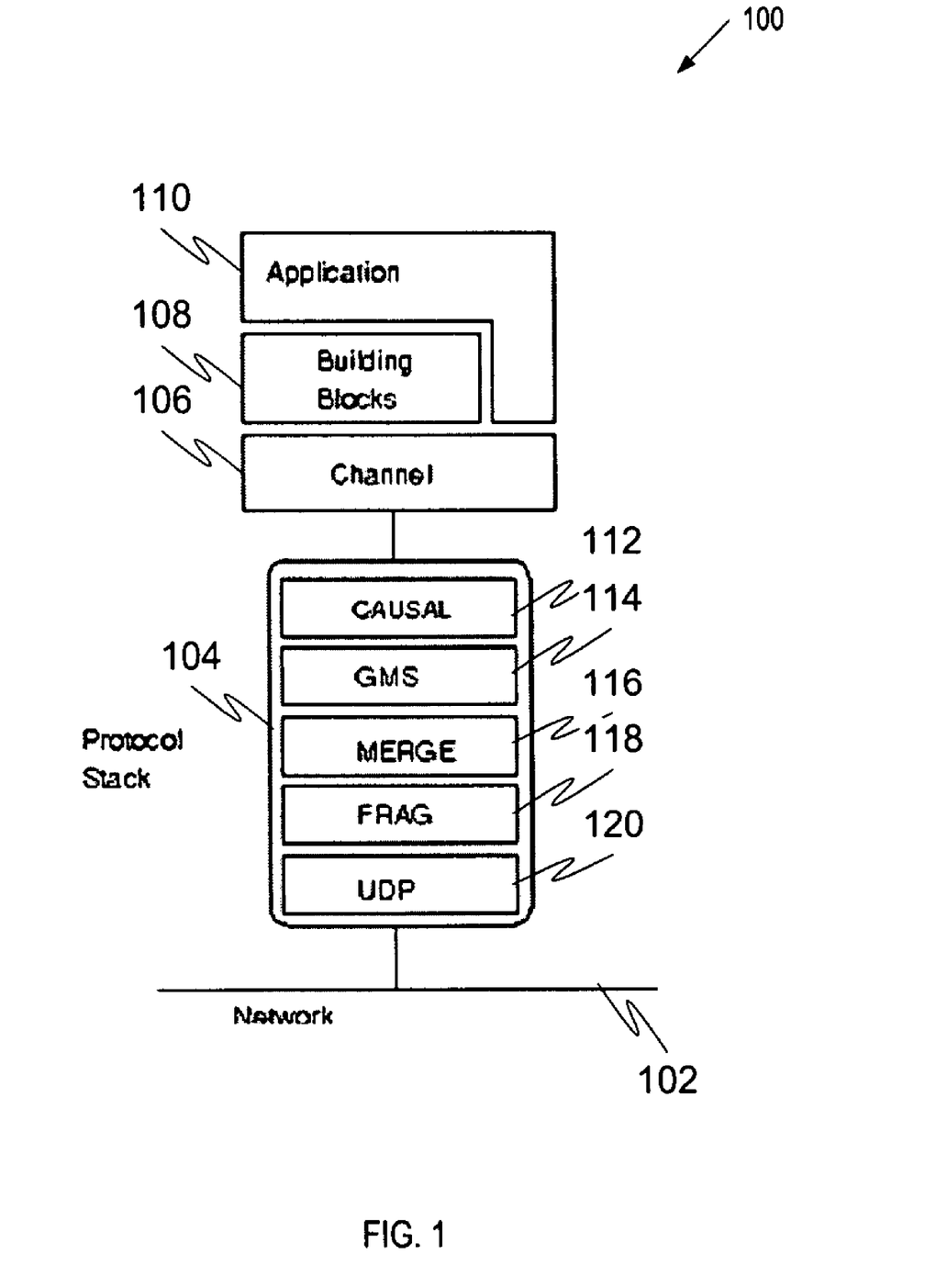
FIG. 1 illustrates a network architecture of a group communication in which embodiments of the present invention may be implemented.

FIG. 1 illustrates an exemplary network architecture of a group communication 100, such as JGroups, in which embodiments of the present invention may operate.

JGroups is toolkit for reliable group communication. Processes can join a group, send messages to all members or single members and receive messages from members in the group. The system keeps track of the members in every group, and notifies group members when a new member joins, or an existing member leaves or crashes. A group is identified by its name. Groups do not have to be created explicitly; when a process joins a non-existing group, that group will be created automatically. Member processes of a group can be located on the same host, within the same LAN, or across a WAN. A member can be part of multiple groups.

The group communication architecture may comprise three parts: (1) a channel API 106 used by application programmers to build reliable group communication applications, (2) building blocks 108, which are layered on top of channel 106 and provide a higher abstraction level and (3) a protocol stack 104, which implements the properties specified for a given channel.

Channel 106 is connected to protocol stack 104. Whenever an application sends a message, channel 106 passes it on to protocol stack 104 comprising several protocols 112, 114, 116, 118, 120. The topmost protocol processes the message and the passes it on to the protocol below it. Thus, the message is handed from protocol to protocol until the bottom protocol puts it on the network 102. The same happens in the reverse direction: the bottom (transport) protocol listens for messages on network 102. When a message is received, it will be handed up protocol stack 104 until it reaches channel 106. Channel 106 stores the message in a queue until application 110 consumes it.

When an application 110 connects to a channel 106, protocol stack 106 will be started, and when it disconnects protocol stack 104 will be stopped. When the channel 106 is closed, the stack 140 will be destroyed, releasing its resources.

Channel

To join a group and send messages, a process has to create a channel and connect to it using the group name (all channels with the same name form a group). The channel is the handle to the group. While connected, a member may send and receive messages to/from all other group members. The client leaves a group by disconnecting from the channel. A channel can be reused: clients can connect to it again after having disconnected. However, a channel may allow only one client to be connected at a time. If multiple groups are to be joined, multiple channels can be created and connected to. A client signals that it no longer wants to use a channel by closing it. After this operation, the channel may not be used any longer.

Each channel has a unique address. Channels always know who the other members are in the same group: a list of member addresses can be retrieved from any channel. This list is called a view. A process can select an address from this list and send a unicast message to it (also to itself), or it may send a multicast message to all members of the current view. Whenever a process joins or leaves a group, or when a crashed process has been detected, a new view is sent to all remaining group members. When a member process is suspected of having crashed, a suspicion message is received by all non-faulty members. Thus, channels receive regular messages, view messages and suspicion messages. A client may choose to turn reception of views and suspicions on/off on a channel basis.

Channels may be similar to BSD sockets: messages are stored in a channel until a client removes the next one (pull-principle). When no message is currently available, a client is blocked until the next available message has been received.

A channel may be implemented over a number of alternatives for group transport. Therefore, a channel is an abstract class, and concrete implementations are derived from it, e.g. a channel implementation using its own protocol stack, or others using existing group transports such as Jchannel and EnsChannel. Applications only deal with the abstract channel class, and the actual implementation can be chosen at startup time.

The properties for a channel may be specified in a colon-delimited string format. When creating a channel (JChannel) a protocol stack will be created according to these properties. All messages will pass through this stack, ensuring the quality of service specified by the properties string for a given channel.

Building Blocks

Channels are simple and primitive. They offer the bare functionality of group communication, and have on purpose been designed after the simple model of BSD sockets, which are widely used and well understood. The reason is that an application can make use of just this small subset of JGroups, without having to include a whole set of sophisticated classes, that it may not even need. Also, a somewhat minimalistic interface is simple to understand: a client needs to know about 12 methods to be able to create and use a channel (and oftentimes will only use 3-4 methods frequently).

Channels provide asynchronous message sending/reception, somewhat similar to UDP. A message sent is essentially put on the network and the send( ) method will return immediately. Conceptual requests, or responses to previous requests, are received in undefined order, and the application has to take care of matching responses with requests.

Also, an application has to actively retrieve messages from a channel (pull-style); it is not notified when a message has been received. Note that pull-style message reception often needs another thread of execution, or some form of event-loop, in which a channel is periodically polled for messages.

JGroups offers building blocks that provide more sophisticated APIs on top of a Channel. Building blocks either create and use channels internally, or require an existing channel to be specified when creating a building block. Applications communicate directly with the building block, rather than the channel. Building blocks are intended to save the application programmer from having to write tedious and recurring code, e.g. request-response correlation.

Protocol Stack

As discussed above, JGroups provides two channel implementations: an Ensemble-based channel and its own channel based on a Java protocol stack. The latter is a protocol stack containing a number of protocol layers in a bidirectional list. FIG. 1 illustrates protocol stack 104 with the following protocols: CAUSAL 112, GMS 114, MERGE 116, FRAG 118, UDP 120.

All messages sent and received over the channel have to pass through the protocol stack. Every layer may modify, reorder, pass or drop a message, or add a header to a message. A fragmentation layer might break up a message into several smaller messages, adding a header with an id to each fragment, and re-assemble the fragments on the receiver's side.

The composition of the protocol stack, i.e. its layers, is determined by the creator of the channel: a property string defines the layers to be used (and the parameters for each layer). This string might be interpreted differently by each channel implementation; in JChannel it is used to create the stack, depending on the protocol names given in the property.

Knowledge about the protocol stack is not necessary when only using channels in an application. However, when an application wishes to ignore the default properties for a protocol stack, and configure their own stack, then knowledge about what the individual layers are supposed to do is needed. Although it is syntactically possible to stack any layer on top of each other (they all have the same interface), this wouldn't make sense semantically in most cases.

Message

Figure 2:
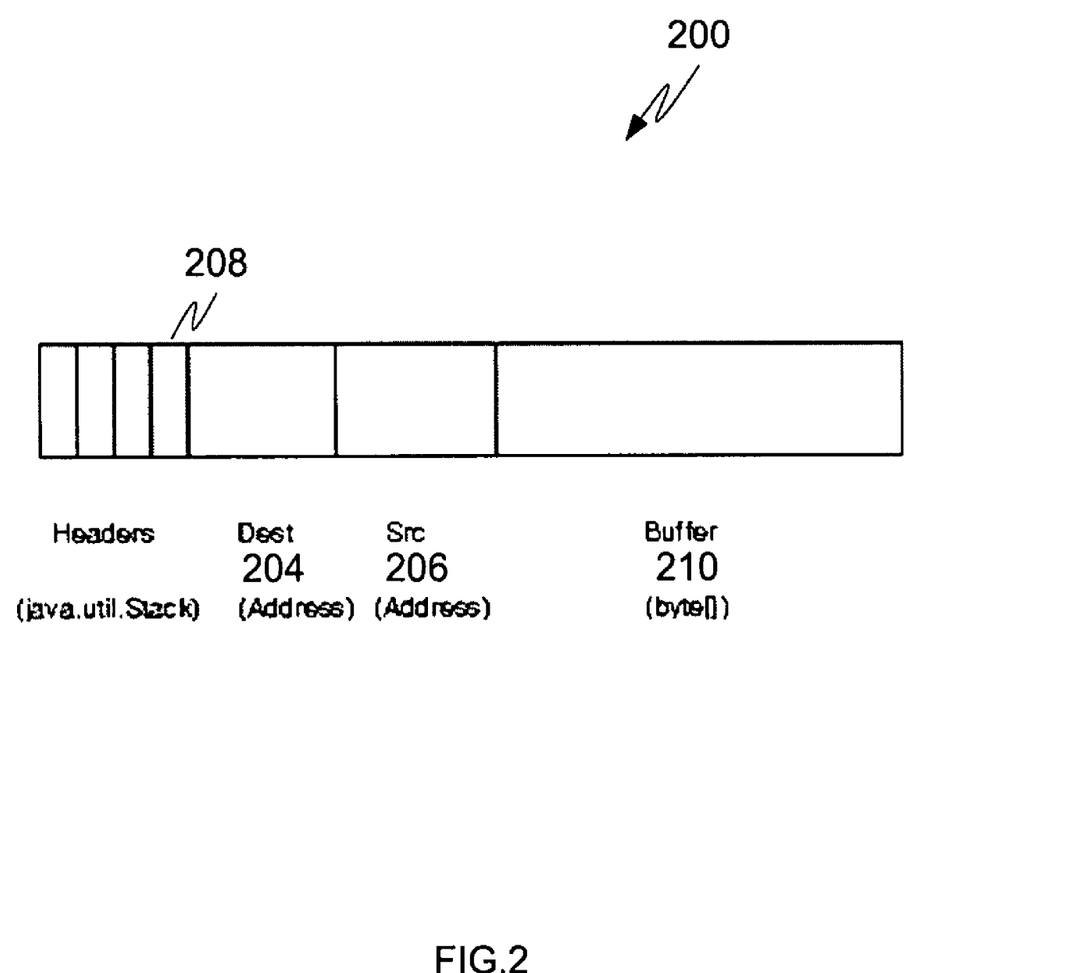
FIG. 2 illustrates a block diagram of one embodiment of a structure of a message.

Data is sent between members in the form of messages. A message can be sent by a member to a single member, or to all members of the group of which the channel is an endpoint. An example of a structure of a message 200 is illustrated in FIG. 2.

The message 200 may contain five fields: headers 202, destination address 204, source address 206, flags 208, and payload 210.

A list of headers 202 can be attached to a message. Anything that should not be in the payload 210 can be attached to message 200 as a header. Methods putHeader( ), getHeader( ), and removeHeader( ) of message 200 can be used to manipulate headers 202.

The destination address 204 may include the address of the receiver. If null, the message will be sent to all current group members.

The source address 206 may include the address of a sender. It can be left null, and will be filled in by the transport protocol (e.g. UDP) before the message is put on the network 102.

One byte of the message 200 may be used for flags 208. Examples of flags may be OOB, LOW_PRIO and HIGH_PRIO.

The payload 210 may include the actual data (as a byte buffer). The message class contains convenience methods to set a serializable object and to retrieve it again, using serialization to convert the object to/from a byte buffer.

The message 200 may be similar to an IP packet and consists of the payload (a byte buffer) and the addresses of the sender and receiver (as addresses). Any message put on the network 102 can be routed to its destination (receiver address), and replies can be returned to the sender's address.

A message usually does not need to fill in the sender's address when sending a message; this is done automatically by the protocol stack before a message is put on the network. However, there may be cases, when the sender of a message wants to give an address different from its own, so that for example, a response should be returned to some other member.

The destination address (receiver) can be an Address, denoting the address of a member, determined e.g. from a message received previously, or it can be null, which means that the message will be sent to all members of the group. A typical multicast message, sending string "Hello" to all members would look like this:

Message msg=new Message(null, null, "Hello". getBytes( ));
channel.send(msg);

Channel States

Figure 3:
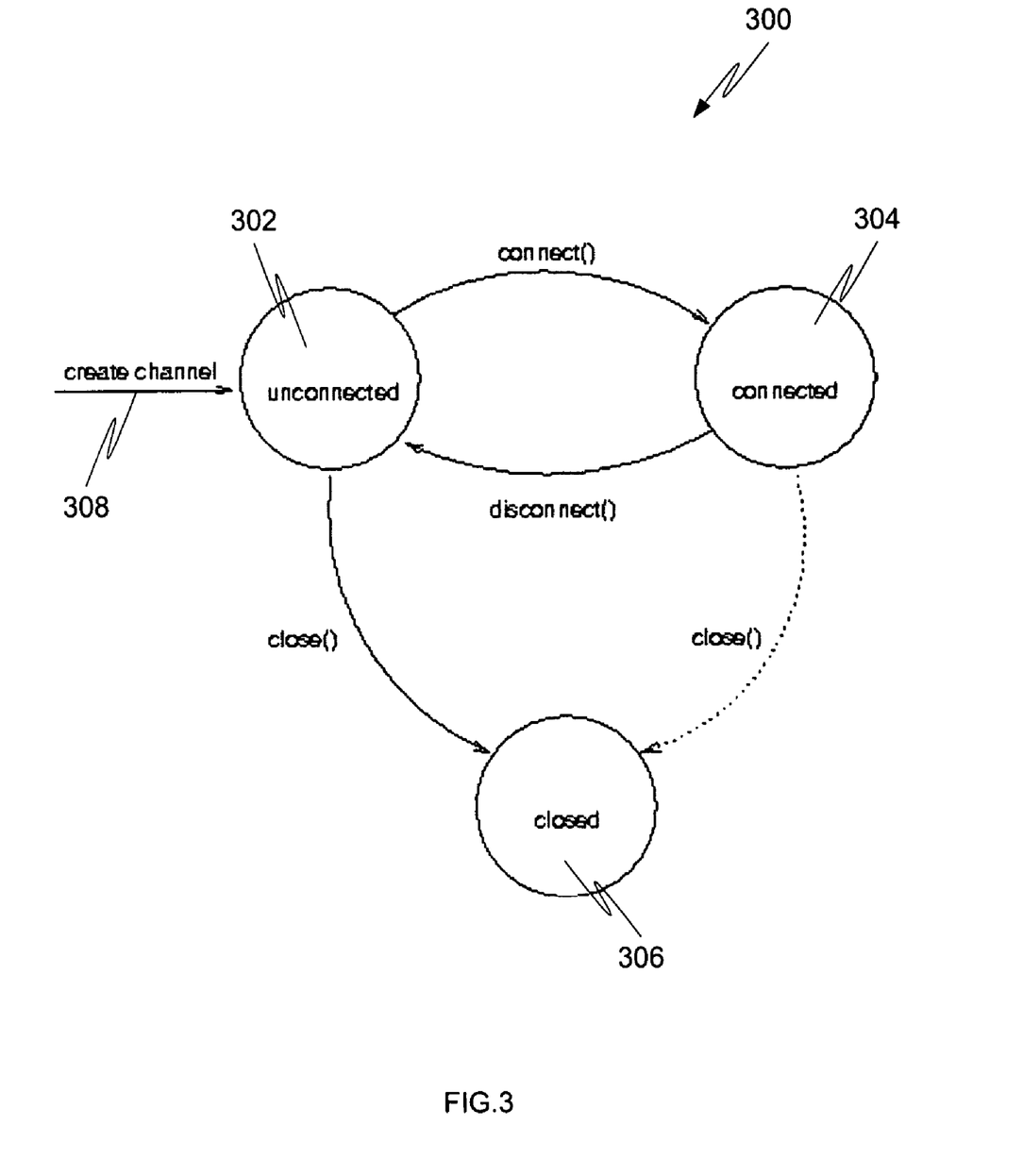
FIG. 3 illustrates a block diagram of one embodiment of channel states.

A state transition diagram 300 for the major states a channel can assume are shown in FIG. 3. In order to join a group and send messages, a process has to create a channel. A channel is like a socket. When a client connects to a channel, it gives the name of the group it would like to join. Thus, a channel is (in its connected state) always associated with a particular group. The protocol stack takes care that channels with the same group name find each other: whenever a client connects to a channel given group name G, then it tries to find existing channels with the same name, and joins them, resulting in a new view being installed (which contains the new member). If no members exist, a new group will be created.

When a channel is first created at 308, it is in the unconnected state 302. An attempt to perform certain operations which are only valid in the connected state (e.g. send/receive messages) will result in an exception. After a successful connection by a client, it moves to the connected state 304. Now channels will receive messages, views and suspicions from other members and may send messages to other members or to the group. Getting the local address of a channel is guaranteed to be a valid operation in this state (see below). When the channel is disconnected, it moves back to the unconnected state 302. Both a connected and unconnected channel may be closed 306, which makes the channel unusable for further operations. Any attempt to do so will result in an exception. When a channel is closed directly from a connected state, it will first be disconnected, and then closed.

Concurrent Stack

Figure 4:
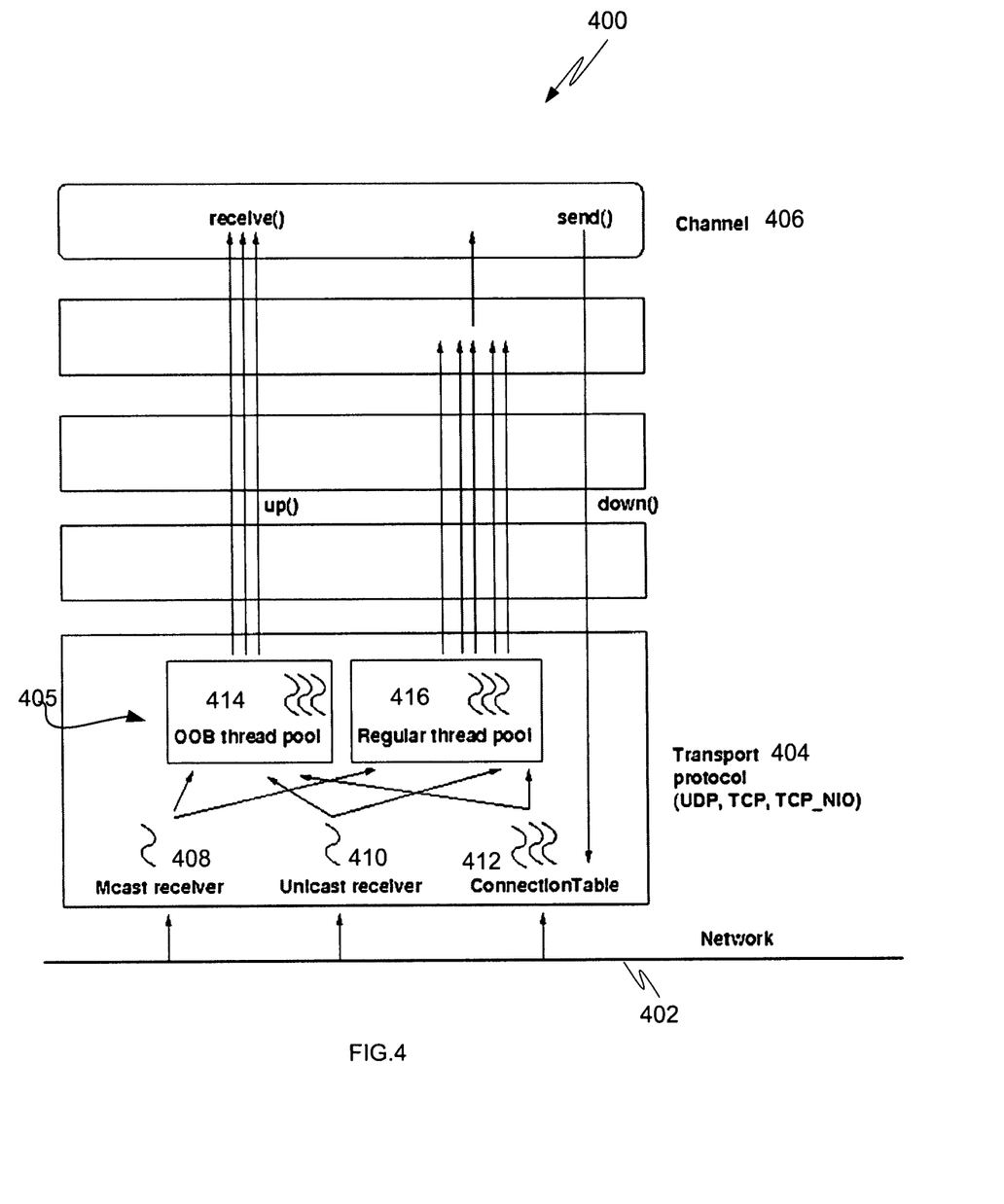
FIG. 4 illustrates a block diagram of one embodiment of a concurrent stack.

The architecture 400 of one embodiment of a concurrent stack 405 is shown in FIG. 4. As previously discussed, channel 406 communicate with transport protocol 404 to a network 402. However, transport protocol 404 may include the following protocols: TP, with subclasses UDP, TCP and TCP_NIO. Therefore, to configure the concurrent stack, the user has to modify the config for (e.g.) UDP in the XML file.

Concurrent stack 405 consists of two thread pools: an out-of-band (OOB) thread pool 414 and a regular thread pool 416. Packets are received from Multicast receiver 408, Unicast receiver 410, or a Connection Table 412 (TCP, TCP_NIO). Packets marked as OOB (with Message.setFlag(Message.OOB)) are dispatched to the OOB thread pool 414, and all other packets are dispatched to the regular thread pool 416.

When a thread pool is disabled, then the thread of the caller (e.g. multicast or unicast receiver threads or the ConnectionTable) is used to send the message up the stack and into the application. Otherwise, the packet will be processed by a thread from the thread pool, which sends the message up the stack. When all current threads are busy, another thread might be created, up to the maximum number of threads defined. Alternatively, the packet might get queued up until a thread becomes available.

The point of using a thread pool is that the receiver threads should only receive the packets and forward them to the thread pools for processing, because unmarshalling and processing is slower than simply receiving the message and can benefit from parallelization.

Out of Band (OOB) Messages

When an application does not care about the ordering properties of a message, the OOB flag can be set and JGroups will deliver this particular message without regard for any ordering. OOB messages completely ignore any ordering constraints the stack might have. Any message marked as OOB will be processed by the OOB thread pool. This is necessary in cases where we don't want the message processing to wait until all other messages from the same sender have been processed.

For example, in a heartbeat case: if sender P sends 5 messages and then a response to a heartbeat request received from some other node, then the time taken to process P's 5 messages might take longer than the heartbeat timeout so that P might get falsely suspected. However, if the heartbeat response is marked as OOB, then it will get processed by the OOB thread pool and therefore might be concurrent to its previously sent 5 messages and not trigger a false suspicion.

Computer System

Figure 5:
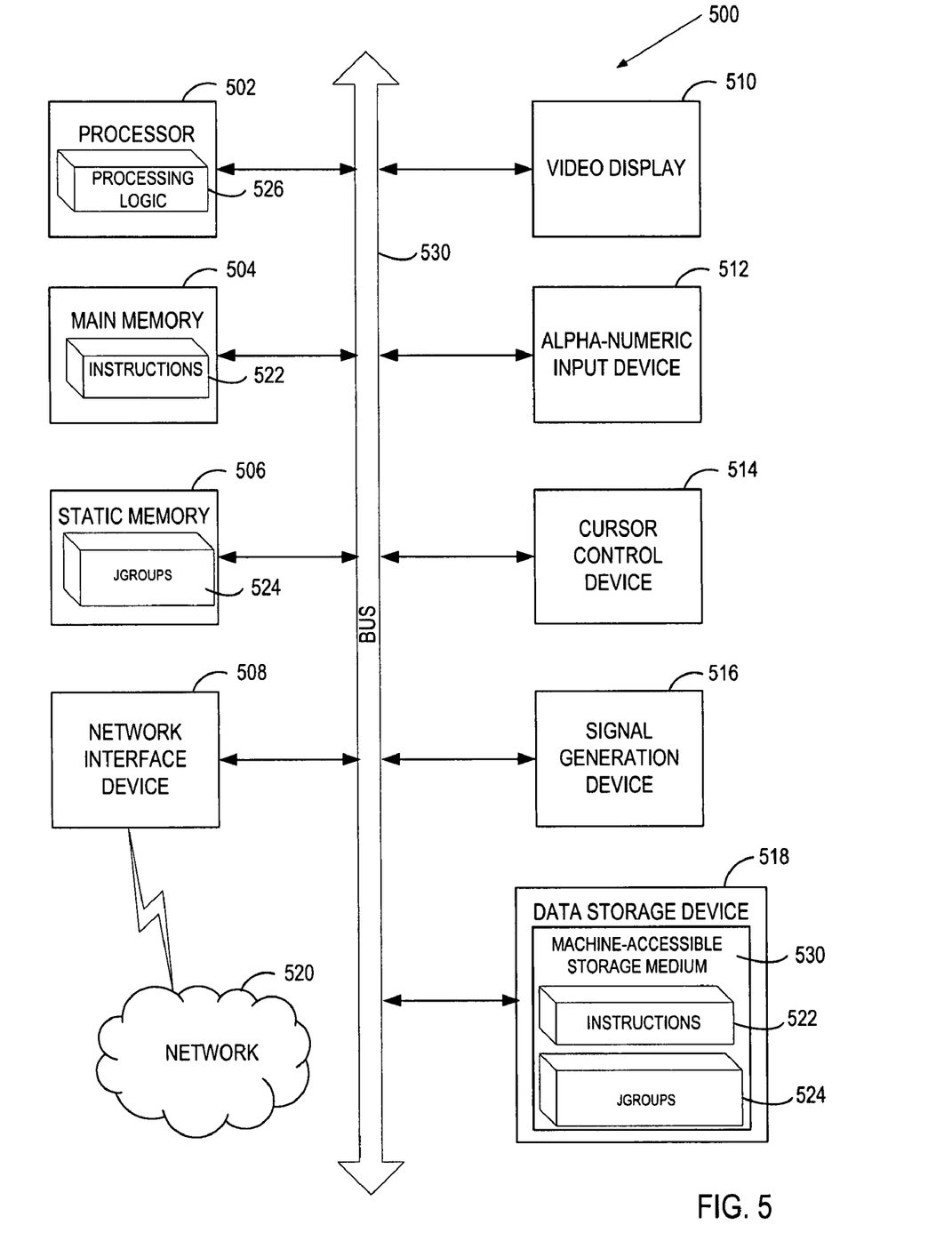
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to JGroups and concurrent stack configurations 524. JGroups and concurrent stack configurations 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention.

Figure 6:
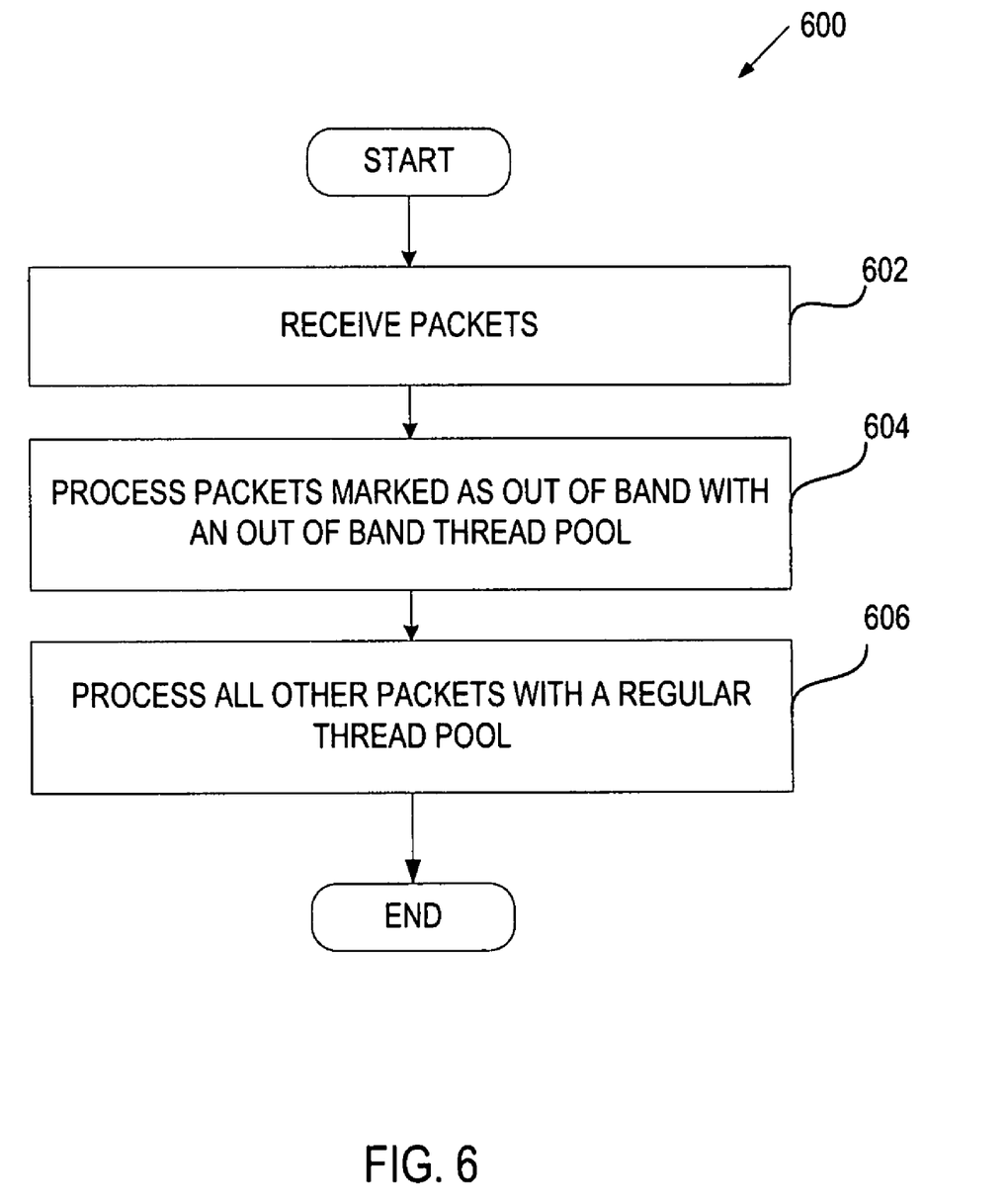
FIG. 6 illustrates a flow diagram of one embodiment of a method for processing messages marked as out of band.

FIG. 6 is a flow diagram illustrating a computer-implemented method for processing messages marked as out of band. The group communication toolkit may be written in Java to provide reliable multicast communication. At 602, messages or packets are received with a transport protocol stack as described above. The transport protocol stack may comprising a multicast receiver thread, a unicast receiver thread, and a connection table. At 604, packets marked as Out of Band are sent to an Out of Band thread pool. At 606, all other packets may be sent to a regular thread pool where a packet may be processed with a thread from the regular thread pool. The out of band thread pool processes the packets marked as out of band before all other packets that are not marked with out of band.

Another thread may be formed to process the packet when all threads from the regular thread pool are busy. Messages for each sender may be processed with one thread from a thread pool of a transport protocol stack.

As discussed above, the thread sends the messages up the transport protocol stack to a corresponding channel of a channel layer, a building block layered on top of the channel layer, and an application programming interface layered on top of the building block.

Thus, a method and apparatus for processing messages marked as out of band has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for processing messages, the method comprising:
   receiving packets at a transport protocol stack, the transport protocol stack comprising a User Datagram Protocol (UDP), a Transmission Control Protocol (TCP), and a concurrent stack, the UDP including a multicast receiver and a unicast receiver, the Transmission Control Protocol (TCP) including a connection table, and the concurrent stack including an Out of Band thread pool and a regular thread pool, at least one of the packets marked as Out of Band; and
   processing packets marked as Out of Band with the Out of Band thread pool before processing all other packets with the regular thread pool.

2. The method of claim 1 further comprising:
   receiving packets from a sender, wherein one of the packets is marked as Out of Band; and
   processing the packets marked as Out of Band from the sender before processing the other packets from the sender.

3. The method of claim 1 further comprising:
   processing a packet marked as out of band with a thread from the out of band thread pool.

4. The method of claim 3 further comprising:
   forming another thread to process the packet marked as out of band when all threads from the out of band thread pool are busy.

5. The method of claim 1 further comprising:
   processing packets marked as Out of Band for each sender with a thread from the out of band thread pool of a transport protocol stack.

6. The method of claim 5 wherein the thread sends the messages up the transport protocol stack to a corresponding channel of a channel layer, a building block layered on top of the channel layer, and an application programming interface layered on top of the building block.

7. A computer-readable storage medium, having instructions stored therein, which when executed cause a computer system to perform a method comprising:
receiving packets at a transport protocol stack the transport protocol stack comprising a User Datagram Protocol (UDP), a Transmission Control Protocol (TCP), and a concurrent stack, the UDP including a multicast receiver and a unicast receiver, the Transmission Control Protocol (TCP) including a connection table, and the concurrent stack including an Out of Band thread pool and a regular thread pool, at least one of the packets marked as Out of Band; and
processing packets marked as Out of Band with the Out of Band thread pool before processing all other packets with the regular thread pool.

8. The computer-readable storage medium of claim 7 wherein the method further comprises:
receiving packets from a sender, wherein one of the packets is marked as Out of Band; and
processing the packets marked as Out of Band from the sender before processing the other packets from the sender.

9. The computer-readable storage medium of claim 7 wherein the method further comprises:
processing a packet marked as out of band with a thread from the out of band thread pool.

10. The computer-readable storage medium of claim 7 wherein the method further comprises:
forming another thread to process the packet marked as out of band when all threads from the out of band thread pool are busy.

11. The computer-readable storage medium of claim 7 wherein the method further comprises:
processing packets marked as Out of Band for each sender with a thread from the out of band thread pool of a transport protocol stack.

12. The computer-readable storage medium of claim 11 wherein the thread sends the messages up the transport protocol stack to a corresponding channel of a channel layer, a building block layered on top of the channel layer, and an application programming interface layered on top of the building block.

* * * * *